(12) United States Patent
Schimpf et al.

(10) Patent No.: US 9,009,609 B2
(45) Date of Patent: Apr. 14, 2015

(54) INTERACTION WITH A VISUALIZED STATE TRANSITION MODEL

(75) Inventors: Brian C. Schimpf, Harvard, MA (US);
Bruce R. Katz, Sudbury, MA (US);
Monica Luke, Bedford, MA (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 13/233,695

(22) Filed: Sep. 15, 2011

(65) Prior Publication Data
US 2013/0073993 A1 Mar. 21, 2013

(51) Int. Cl.
*G06F 3/00* (2006.01)
*G06F 9/44* (2006.01)
*G06F 9/48* (2006.01)
*G06Q 10/06* (2012.01)
*G06F 3/048* (2013.01)

(52) U.S. Cl.
CPC *G06F 8/38* (2013.01); *G06F 9/485* (2013.01); *G06F 9/444* (2013.01); *G06Q 10/0633* (2013.01); *G06F 9/4443* (2013.01); *G06F 3/048* (2013.01); *G06F 8/74* (2013.01)

(58) Field of Classification Search
CPC . G05B 2219/23006; G06F 9/46; G06F 9/444; G06F 9/485; G06F 9/4443; G06F 8/38; G06F 3/048; G06G 7/62; G06Q 10/0633
USPC ........................... 715/762, 764; 717/125, 124
See application file for complete search history.

(56) References Cited

U.S. PATENT DOCUMENTS

| | | | |
|---|---|---|---|
| 7,526,501 B2 | 4/2009 | Albahari et al. | |
| 7,669,141 B1 | 2/2010 | Pegg | |
| 7,793,300 B2 | 9/2010 | Dutta et al. | |
| 2005/0071777 A1 | 3/2005 | Roessler et al. | |
| 2006/0085681 A1 | 4/2006 | Feldstein et al. | |
| 2008/0126168 A1* | 5/2008 | Carney et al. | 705/8 |
| 2008/0270101 A1 | 10/2008 | Salmela | |
| 2008/0288916 A1 | 11/2008 | Tazoe et al. | |
| 2009/0019440 A1 | 1/2009 | Ando | |
| 2009/0179921 A1 | 7/2009 | Raghavan et al. | |
| 2010/0218041 A1 | 8/2010 | Tenenti | |
| 2010/0223446 A1 | 9/2010 | Katariya et al. | |
| 2011/0145741 A1* | 6/2011 | Das | 715/764 |
| 2012/0303396 A1* | 11/2012 | Winkler et al. | 705/7.11 |

OTHER PUBLICATIONS

Blass, et al., "Smooth Graphs for Visual Exploration of Higher-Order State Transitions", IEEE, vol. 15, No. 6 (2009), pp. 969-976.
(Continued)

*Primary Examiner* — Tuyetlien Tran
*Assistant Examiner* — Jaime Duckworth
(74) *Attorney, Agent, or Firm* — Holland & Knight LLP; Brian J. Colandreo, Esq.; Jeffrey T. Placker, Esq.

(57) ABSTRACT

A state transition model is dynamically generated for an active application. A graphical user interface is generated based upon, at least in part, the state transition model for the active application. The graphical user interface includes an indication of a current state of a record within the active application. The record is manipulated within the active application in response to an input received in association with the graphical user interface.

21 Claims, 6 Drawing Sheets

(56) References Cited

OTHER PUBLICATIONS

Some, et al., "Enhancing Program Comprehension with recovered State Models", IEEE, (2002), pp. 1-9.

Coyler, A.M., "User Interface for Displaying States of Objects", IBM Technical Disclosure Bulletin, vol. 38, No. 9 (Sep. 1995), pp. 206-210.

* cited by examiner

INTERACTION WITH A VISUALIZED STATE TRANSITION MODEL

BACKGROUND OF THE DISCLOSURE

The present disclosure relates to state transition models, and more particularly relates to providing visual representations of state transition models.

Many software products accomplish their function using a structured state transition model. An object may be acted upon by the software product to transition the object from one state to another state. Depending upon the nature of the object and various decisions or action taken during the course of the operation of the software product, requirements of subsequent transitions and states that may be achieved by the object may vary. As such, it may not be readily apparent to a user of the software product what requirements or states may be experienced by the object during the operation of the software product.

SUMMARY OF THE DISCLOSURE

According to a first implementation, a method may include dynamically generating a state transition model for an active application. A graphical user interface may be generated based upon, at least in part, the state transition model for the active application. The graphical user interface may include an indication of a current state of a record within the active application. The record may be manipulated within the active application in response to an input received in association with the graphical user interface.

One or more of the following features may be included. The graphical user interface may include an indication of permissible transitions of the record. The graphical user interface may include annotative information regarding the current state of the record. The graphical user interface may include a visual representation of at least a portion of a state transition model for the record.

Manipulating the record within the active application may include transitioning the record from the current state to a new state. Transitioning the record from the initial state to the new state may include receiving, in association with the graphical user interface, a required input to transition the record from the initial state to the new state. Manipulating the record may include generating a hypothetical transition scenario. Generating the hypothetical transition scenario may include providing an indication of requirements for the hypothetical transition scenario.

According to another implementation, a computer program product residing on a computer readable medium has a plurality of instructions stored on it. When executed by a processor, the instructions may cause the processor to perform operations comprising dynamically generating a state transition model for an active application. The instructions may also cause the processor to generate a graphical user interface based upon, at least in part, the state transition model for the active application. The graphical user interface may include an indication of a current state of a record within the active application. The record may be manipulated within the active application in response to an input received in association with the graphical user interface.

One or more of the following features may be included. The graphical user interface may include an indication of permissible transitions of the record. The graphical user interface may include annotative information regarding the current state of the record. The graphical user interface may include a visual representation of at least a portion of a state transition model for the record.

The instructions for manipulating the record within the active application may include instructions for transitioning the record from the current state to a new state. The instructions for transitioning the record from the initial state to the new state may include instructions for receiving, in association with the graphical user interface, a required input to transition the record from the initial state to the new state. The instructions for manipulating the record may include instructions for generating a hypothetical transition scenario. The instructions for generating the hypothetical transition scenario may include instructions for providing an indication of requirements for the hypothetical transition scenario.

According to yet another implementation, a system may include a processor and a memory architecture coupled with the processor. A first software module may be executable by the processor and the memory architecture. The first software module may be configured to dynamically generate a state transition model for an active application. A second software module may also be executable by the processor and the memory architecture. The second software module may be configured to generate a graphical user interface based upon, at least in part, the state transition model for the active application, the graphical user interface including an indication of a current state of a record within the active application. A third software module may also be executable by the processor and the memory architecture. The third software module may be configured to manipulate the record within the active application in response to an input received in association with the graphical user interface.

One or more of the following features may be included. The graphical user interface may include an indication of permissible transitions of the record. The graphical user interface may include annotative information regarding the current state of the record. The graphical user interface may include a visual representation of at least a portion of a state transition model for the record.

The third software module, configured to manipulate the record within the active application, may be configured to transition the record from the current state to a new state. The third software module, configured to transition the record from the initial state to the new state, may be configured to receive, in association with the graphical user interface, a required input to transition the record from the initial state to the new state. The third software module, configured to manipulate the record, may be configured to generate a hypothetical transition scenario. The third software module, configured to generate the hypothetical transition scenario, may be configured to provide an indication of requirements for the hypothetical transition scenario.

The details of one or more implementations are set forth in the accompanying drawings and the description below. Other features will become apparent from the description, the drawings, and the claims.

DETAILED DESCRIPTION OF THE INVENTION

Figure 1:
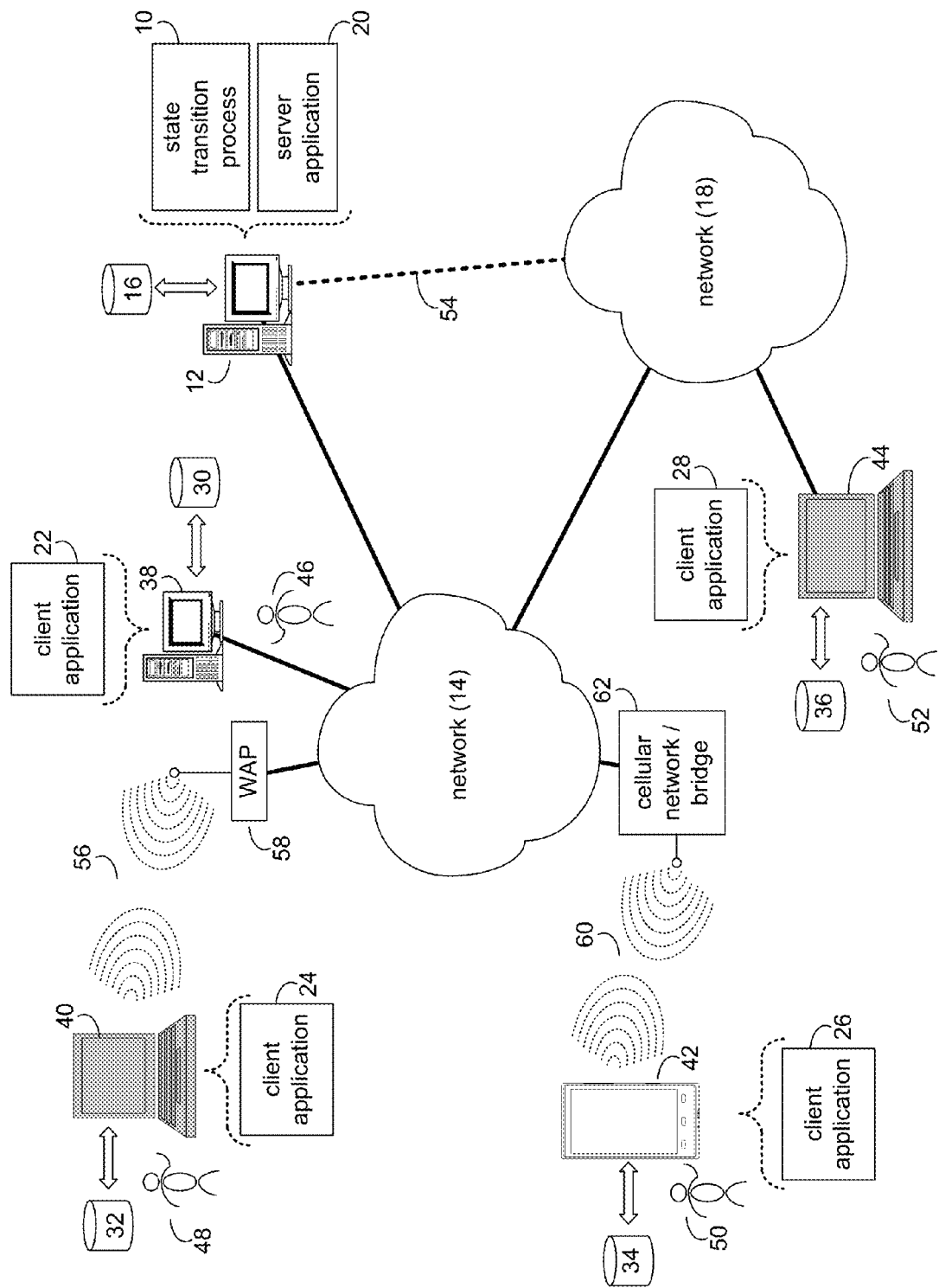
FIG. 1 diagrammatically depicts a state transition process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium (also herein referred to as a computer readable medium and/or a storage device associated with a computing device or client electronic device) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable or computer-readable medium may be any non-transitory medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown state transition process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the state transition process may reside on and be executed, in whole or in part, by a client electronic device, such as a personal computer, notebook computer, personal digital assistant, or the like.

As will be described in greater detail below, state transition process 10 may dynamically generate a state transition model for an active application. A graphical user interface may be generated based upon, at least in part, the state transition model for the active application. The graphical user interface may include an indication of a current state of a record within the active application. State transition process 10 may manipulate the record within the active application in response to an input received in association with the graphical user interface.

The instruction sets and subroutines of state transition process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may also execute server application 20. Server application 20 may include any software product that accomplishes its function using a structured state transition model. Examples of such software products may include, but are not limited to, business applications, such as purchasing systems; a request tracking system, such as IBM® Rational® ClearQuest®; as well as any other software product that may accomplish its function using a structured state transition model. (IBM, Rational, and ClearQuest are all registered trademarks of International Business Machines Corporation in the United States, other countries or both). The instruction sets and subroutines of server application 20, which may be stored on storage device 16 coupled to server computer 12 may be executed by one or more processors (not shown) and one or more memory modules (not shown) incorporated into server computer 12.

Server application 20 may perform operations on an object (herein referred to as a record) to transition the record from one state to another in accordance with the structured state transition model of application 20. In various embodiments, one or more client applications (client applications 22, 24, 26, 28) may interact with server application 20 to, for example, provide instructions and/or inputs necessary for transitioning the record from one state to another state. Client applications 22, 24, 26, 28 may include, for example, a web browser that may access and interact with server application 20 via a web interface and/or utilizing web services. Additionally/alternatively, client application 22, 24, 26, 28 may include a custom client application that may interact with server application 20 (e.g., for providing instructions and/or inputs for transitioning the record from one state to another state).

State transition process 10 may be a stand alone application, or may be an applet/application/script that may interact with and/or be executed within server application 20. In addition/as an alternative to being a server-side process, the state transition process may be a client-side process (not shown) that may reside on a client electronic device (described below) and may interact with a client application (e.g., one or more of client applications 22, 24, 26, 28). Further, the state transition process may be a hybrid server-side/client-side process that may interact with server application 20 and a client application (e.g., one or more of client applications 22, 24, 26, 28). As such, the state transition process may reside, in whole, or in part, on server computer 12 and/or one or more client electronic devices.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, tablet computer or the like), notebook computer 44, for example. Client electronic devices 38, 40, 42, 44 may each execute an appropriate operating system, such as Microsoft® Windows®, Microsoft Windows CE®, Red Hat Linux, or other suitable operating system. (Microsoft, Windows, and Windows CE are registered trademarks of Microsoft Corporation in the United States, other countries, or both). Using client applications 22, 24, 26, 28, users 46, 48, 50, 52 may access server application 20 and may allow users to e.g., provide instructions and/or inputs for transitioning one or more records from one state to another state.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (i.e., the computer that executes server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Mobile computing device 42 is shown wirelessly coupled to network 14 via wireless communication channel 60 established between mobile computing device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the purpose of the following description, client electronic device 38 and client application 22 may be discussed. However, this is for illustrative purposes only and should not be construed as a limitation of the present disclosure, as other client electronic device (e.g., client electronic devices 40, 42, 44) and other client applications (e.g., client applications 24, 26, 28) may be equally utilized.

Figure 2:
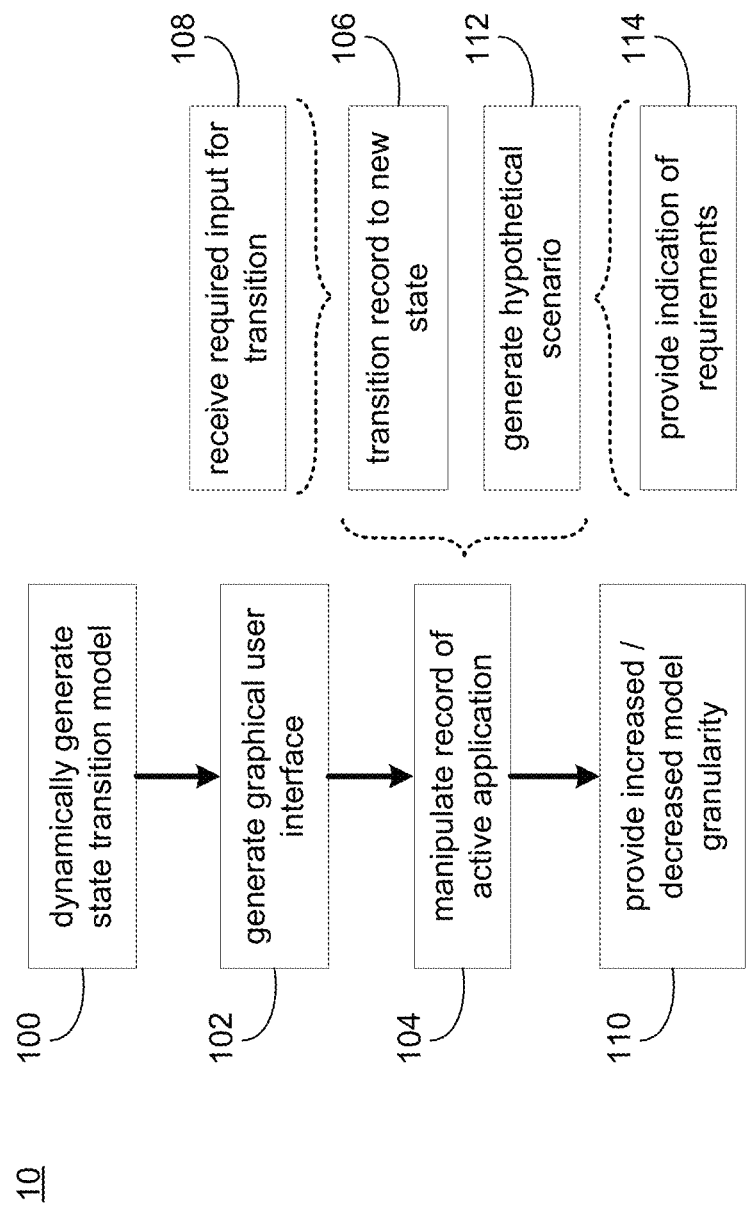
FIG. 2 is a flowchart of a process executed by the state transition process of FIG. 1.

Referring also to FIG. 2, state transition process 10 may dynamically generate 100 a state transition model for an active application. Further, state transition process 10 may generate 102 a graphical user interface based upon, at least in part, the state transition model for the active application. The graphical user interface may include an indication of a current state of a record within the active application. Further, state transition process 10 may manipulate 104 the record within the active application in response to an input received in association with the graphical user interface.

Figure 3:
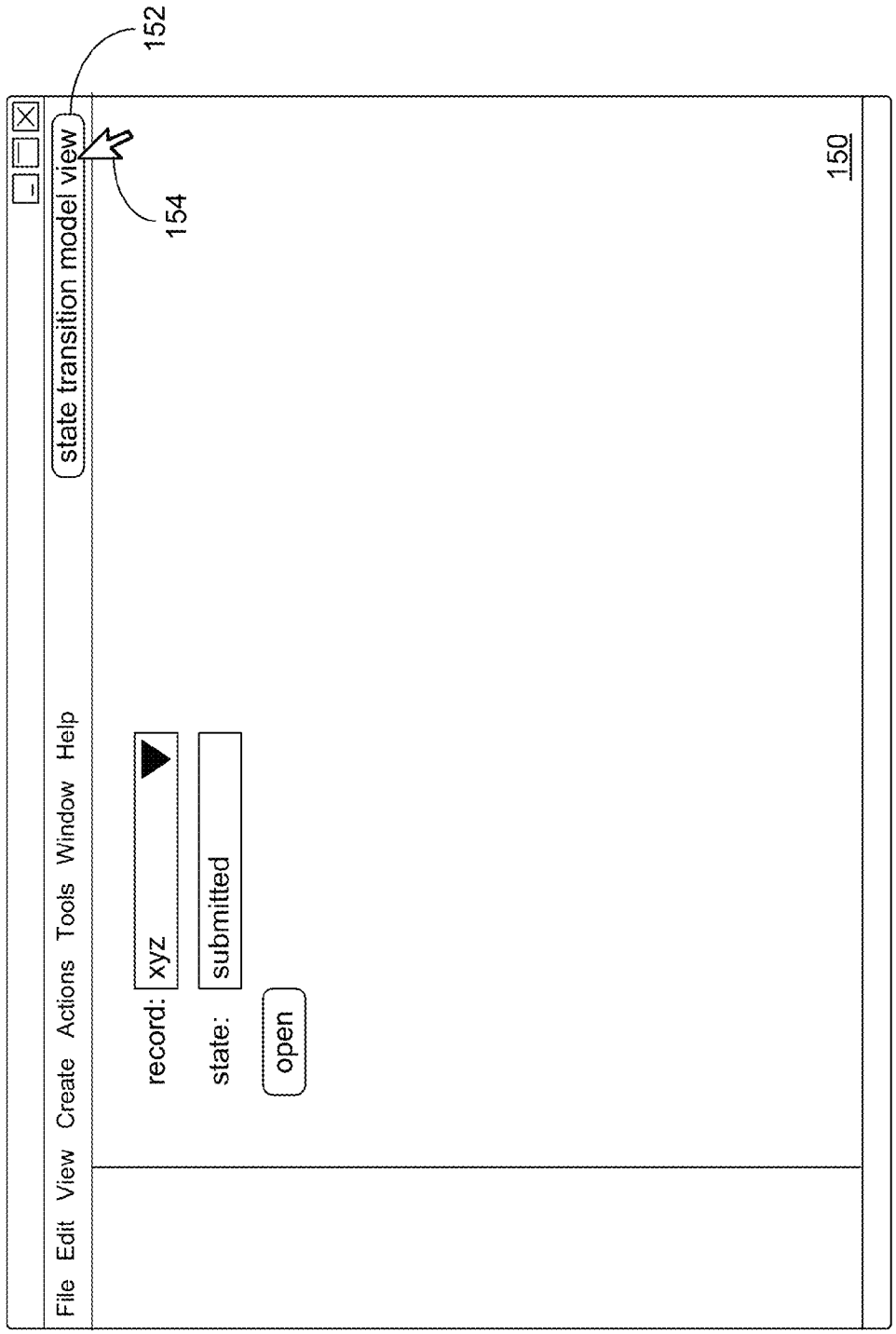
FIG. 3 graphically depicts a user interface rendered by a server application alone, or in conjunction with a client application of FIG. 1.

For example, and referring also to FIG. 3, server application 20, which may be accessed by a user (e.g., user 46) via client application 22, may include a defect tracking application. In such an example, the defect tracking application (e.g., server application 20) may allow user to view defects or problems occurring during development of a software product, attempt to remedy such defects or problems, and the like. User 46 may utilize state transition process 10 to, for example, to gain a better understanding of the state transition model associated with server application 20, as well as gain a better understanding of how the state transition model may be negotiated in the context of given record (e.g. an object being acted upon by server application 20 in accordance with the state transition model associated with server application 20). Of course, such uses of state transition process 10 are provided for illustrative purposes only, as additional/alternative uses and information may be available via state transition process 10.

Continuing with the above-stated example, server application 20 (e.g., in conjunction with client application 22) may render a defect tracking application display/user interface (e.g., display 150), via which user 46 may obtain information about, and/or process, a record (e.g., active record "xyz" having a current state of "submitted" shown within display 150 of server application 20, which may be the active application being utilized by user 46). User 46 may bring up a visual representation of the state transition model associated with server application 20 relative to record xyz by selecting "state transition model view" button 152 within display 150 using onscreen pointer 154 (e.g., which may be controlled by a pointing device, such as a mouse; not shown). In response to selecting "state transition model view" button 152, state transition process 10 may dynamically generate 100 a state transition model for server application 20 (i.e., the active application) with respect to record xyz. The state transition model for server application 20 may be dynamically generated 100 based upon, at least in part, a state transition specification, state chart rules and capabilities, etc., included within server application 20. As the state transition model may be dynamically generated 100 from a state transition specification (or the like) included within server application 20, the dynamically generated 100 state transition model may insure consistency between the state transition model and the operation of server application 20.

Figure 4:
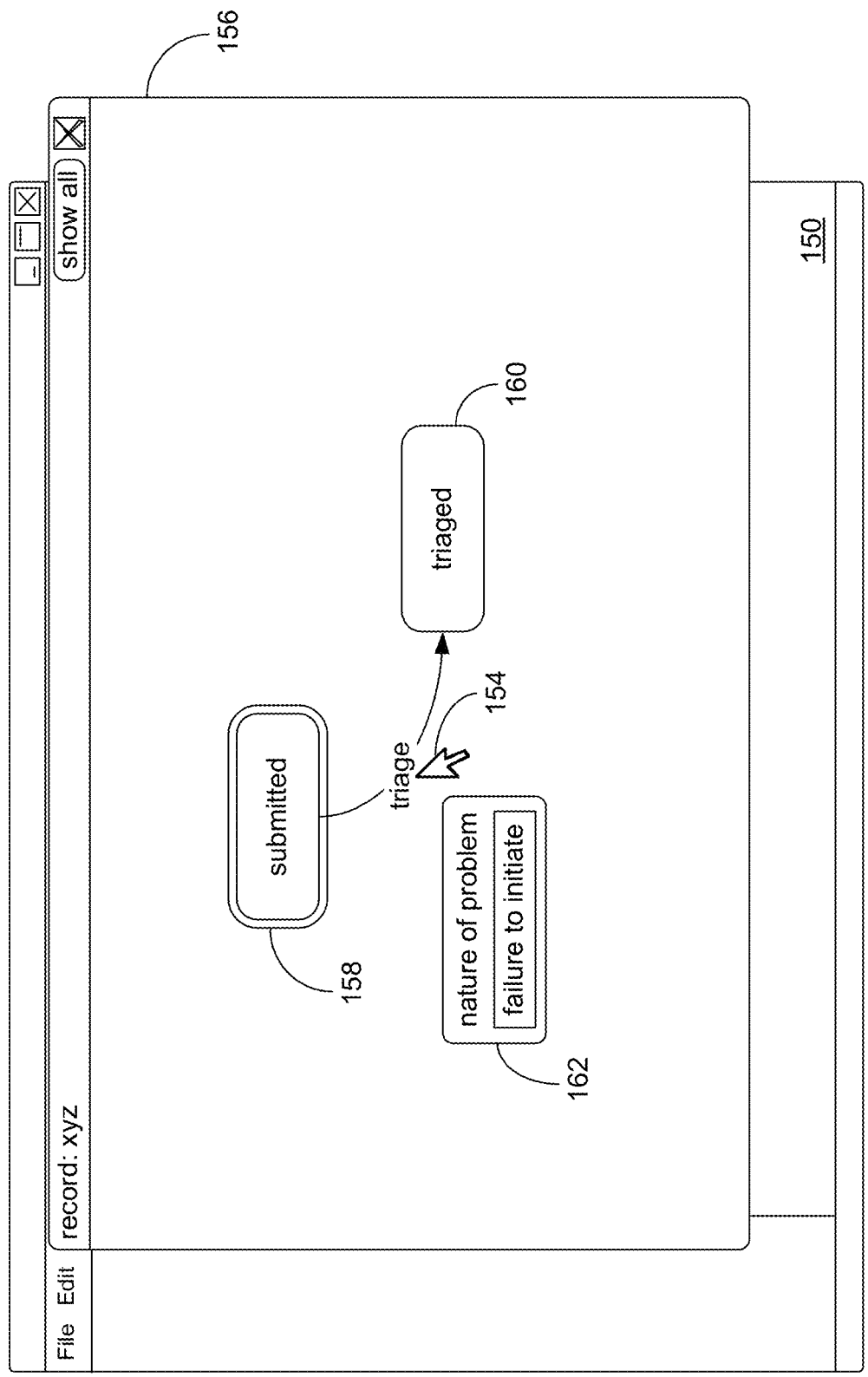
FIG. 4 graphically depicts a user interface rendered by a client application alone, or in conjunction with the state transition process of FIG. 1.

With reference also to FIG. 4, state transition process 10 may generate 102 graphical user interface 156 based upon, at least in part, the dynamically generated 100 state transition model for server application 20. Graphical user interface 156 may be generated 102 from an XML representation or other suitable mechanism. As such, graphical user interface 156 may provide a visual representation of the state transition model for server application 20. As shown, graphical user interface 156 may include an indication of the current state of record xyz. For example, in the illustrated example, graphical user interface 156 may indicate that the current state of record xyz is "submitted" by emphasized (e.g., double outlined) block 158. The double outlined emphasis is intended for illustrative purposes only, as various additional/alternative means for indicating the current state of the record may equally be utilized, such as color coding, highlighting, different shapes, or any other graphical indicator.

In addition to including an indicator of the current state of record xyz, graphical user interface 156 may also include a visual representation of at least a portion of the state transition model for record xyz. For example, as shown record xyz may have a current state of "submitted." Additionally, graphical user interface 156 may indicate that the next permissible state for record xyz may be "triaged." Further, graphical user interface 156 include an indication of permissible transitions for record xyz. For example, as shown in FIG. 4, graphical user interface 156 may visually represent that record xyz may transition from the current "submitted" state to the next "triaged" state by way of a "triage" action that may be performed on record xyz. The permissible transitions for record xyz may be based upon, at least in part, record attributes, permissions or authorizations of the user working on record xyz, or the like. Additionally, while in the example of FIG. 4 the graphical user interface may indicate only permissible transitions and states, the graphical user interface may additionally/alternatively indicate all possible states and transitions for the record. In such an additional/alternative embodiment, non-permissible states and transitions (e.g., which may arise via record attributes, permissions or authorizations of the current user, or the like) may be indicated as being non-permissible, e.g., by being grayed-out, or the like.

State transition process 10 may manipulate 104 record xyz in response to an input received in association with graphical user interface 156. For example, state transition process 10 may manipulate 104 record xyz within server application 20 by transitioning 106 record xyz from an initial state (e.g., submitted) to a new state (e.g., triaged, in the illustrated example). For example, state transition process 10 may transition 106 record xyz from the "submitted" state to the "triaged" state in response to user 46 selecting (e.g., via onscreen pointer 154) the "triage" action, shown in graphical user interface 156 as the transition linking the "submitted" state and the "triaged" state. Additionally/alternatively, state transition process 10 may transition 106 record xyz from the "submitted" state to the "triaged" state in response to user 46 selecting (e.g., via onscreen pointer 154) "triaged" block 160 within graphical user interface 156. It will be appreciated that the state transition process may transition the record from the initial state to the new state in response to various additional/alternative gestures.

Transitioning 106 the record from the initial state to the new state may include receiving 108, in association with the graphical user interface, a required input to transition the record from the initial state to the new state. For example, and still referring to FIG. 4, in response to user 46 selecting the "triage" action from within graphical user interface 156, state transition process 10 (alone and/or in conjunction with one or more of client application 22 and server application 20) render popup 162. Popup 162 may include an input field via which user 46 may input the information required to transition 106 record xyz from the "submitted" state to the "triaged" state. In response to user 46 inputting the required input (e.g., the nature of the problem, in the illustrated example), state transition process 10 receive 108 the required input (e.g., "failure to initiate," in the illustrated example), and may transition 106 record xyz from the initial, "submitted," state to the new, "triaged," state. It will be appreciated that additional/alternative forms of inputs may be required to transition a record from an initial state to a new state depending upon the nature of the record and the nature of the active application.

Figure 5:
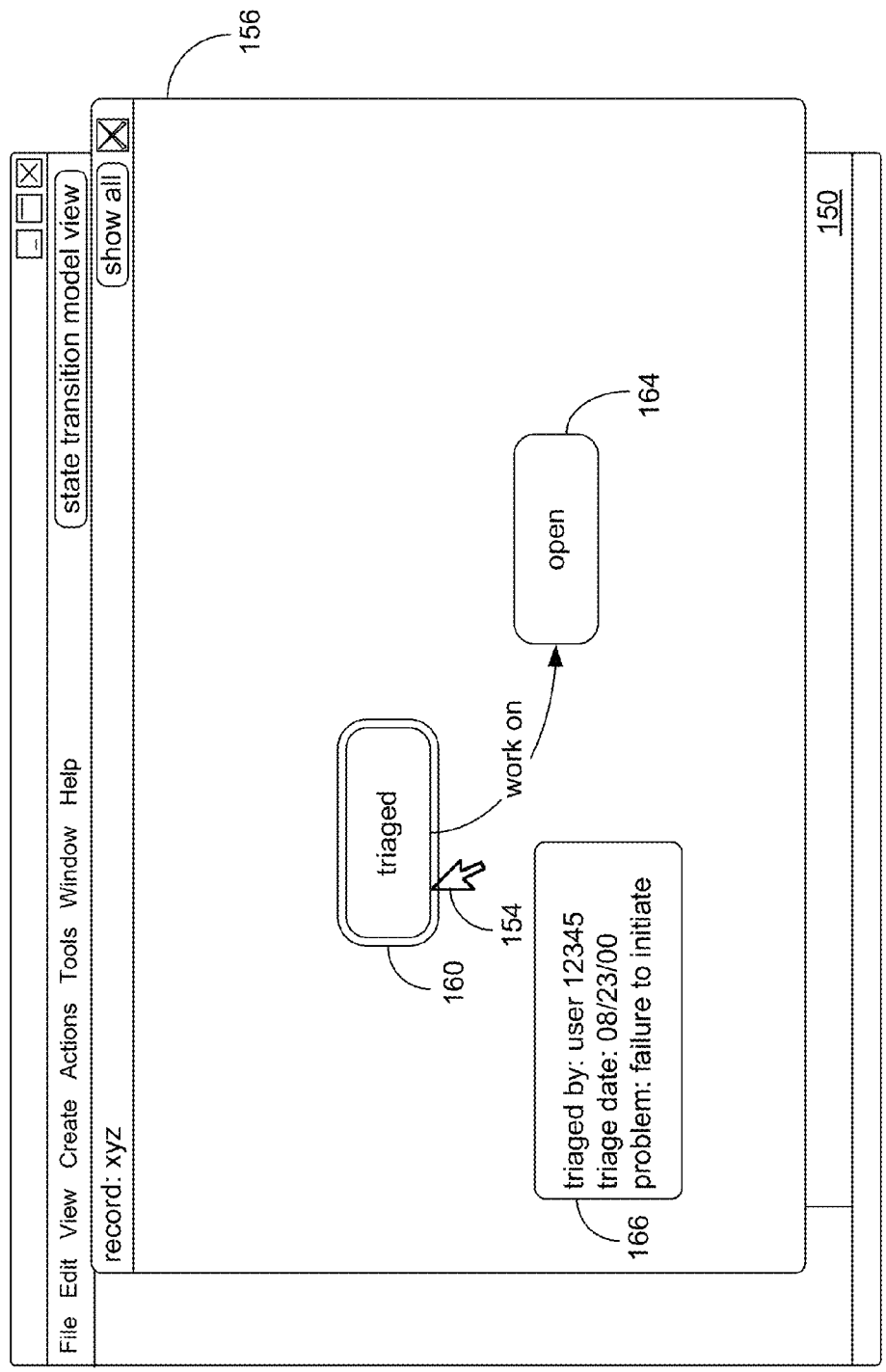
FIG. 5 graphically depicts a user interface rendered by a client application alone, or in conjunction with the state transition process of FIG. 1.

In an embodiment, state transition process 10 may interact with server application 20 to provide the required information (e.g., "failure to initiate") to server application 20. In response to receiving the required information from state transition process 10, server application 20 may transition the record xyz from the "submitted" state to the "triaged" state. Further, and referring also to FIG. 5, upon transitioning 106 record xyz to the "triaged" state, state transition process 10 may update graphical user interface 156 to indicate the new current state of record xyz (e.g., "triaged" in the illustrated example). Further, graphical user interface may indicate the next permissible state for record xyz (e.g., "open" 164 in the illustrated example), as well as the action (e.g., "work on") to transition record xyz from the "triaged" state to the "open" state.

According to an embodiment, state transition process 10 may be capable of providing annotative information regarding record xyz and its current state. For example, user 46 may request annotative information by selecting (e.g., by right-clicking) the current state (or any other state or action, depending upon the available features of the state transition process) of record xyz. For example, user 46 may right click on "triaged" block 160 within graphical user interface 154. State transition process 10 (alone and/or in conjunction with one or more of client application 22 and server application 20) may render (either directly or in response to selecting an option from within a popup menu or the like; not shown) annotation popup 166. Annotation popup 166 may include various information about record xyz, the current state of record xyz, and/or any other information about record xyz, the state transition model, server application 20, etc., depending upon design criteria and user preference.

Figure 6:
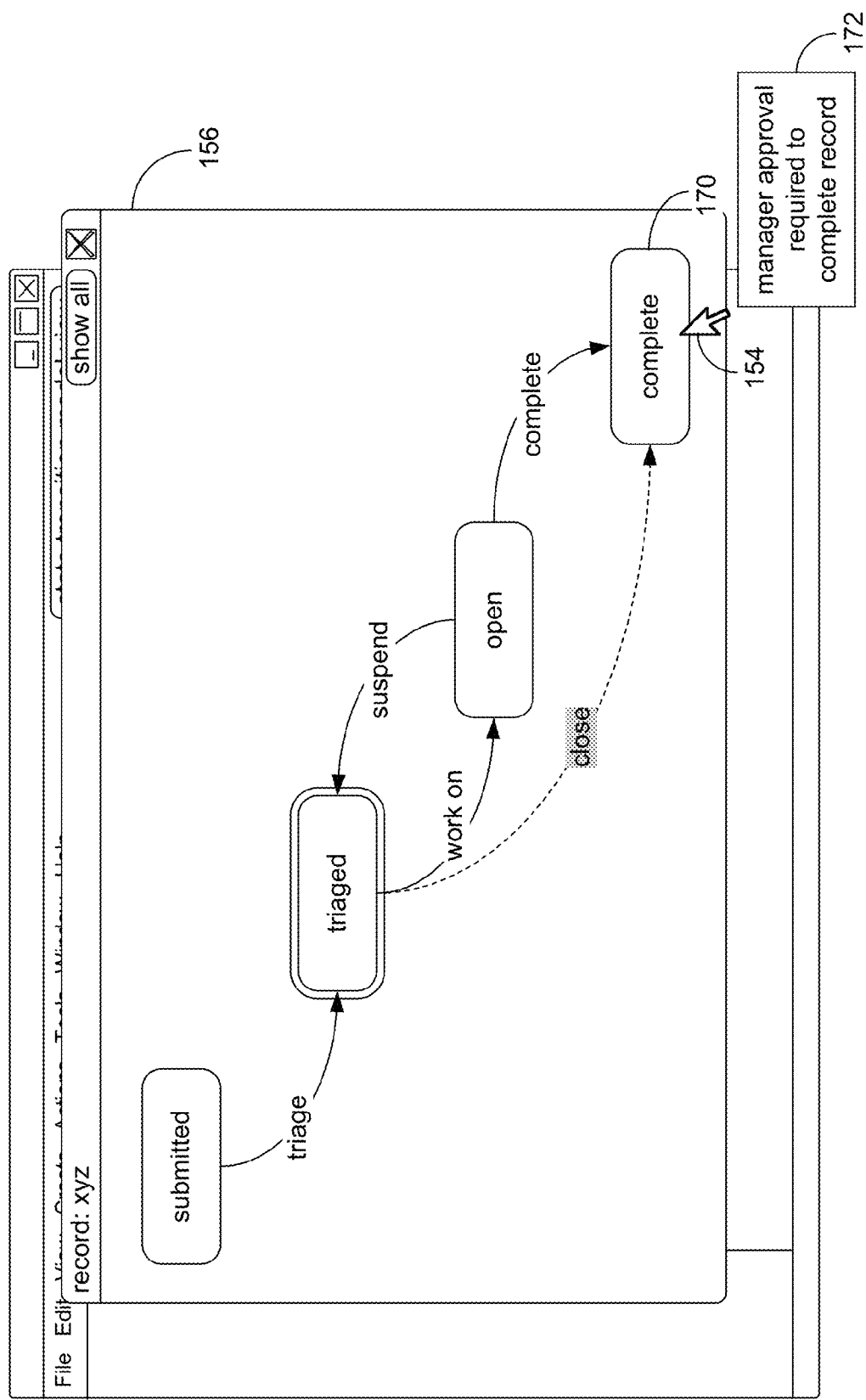
FIG. 6 graphically depicts a user interface rendered by a client application alone, or in conjunction with the state transition process of FIG. 1.

In the preceding examples, graphical user interface 154 has been shown and described as including a current state of the record, as well as a next permissible state and the action required to transition from the current state to the next permissible state. In some embodiments, state transition process may be configured to provide 110 increased and/or decreased state transition model granularity. For example, user 46 may select (e.g., via onscreen pointer 154) "show all" button 168 of graphical user interface. Referring also to FIG. 6, in response to user 46 selecting "show all" button 168, state transition process 10 may provide 110 graphical user interface 156 including a visual representation of the entire state transition model associated with record xyz. As shown, the visual representation of the entire state transition model may depict all of the possible states of record xyz, as well as all available transitions for record xyz. As shown, in some embodiments, graphical user interface 156 may depict permissible, as well as impermissible (e.g., based upon user credentials or authorizations, record attributes, or the like) transitions and/or state. For example, the transition "close," by which record xyz may transition from the "triaged" state to the "complete" state may be an impermissible transition for the current user, as shown by broken action line and grayed-out action identifier. Additionally/alternatively, impermissible states and/or actions may be omitted from the visual representation provided by graphical user interface 156, depending upon design criteria and user preference. Further, state transition process 10 may provide zoom and/or navigation tools (not shown) which may allow the user to view greater (or lesser) details of various portions of the state transition model, as well as navigate a complex state transition model that may extend beyond the confines of a single viewable screen of the graphical user interface.

Based upon the visual representation of the entire state transition model for record xyz, it may be possible for user 46 to ascertain wherein the record stands in terms of the overall process. For example, in graphical user interface 156 shown in FIG. 6, user 46 may ascertain that record xyz is in the second state of the process and that two more states remain in the process before completion.

With reference still to FIG. 6, manipulating 104 the record of the active application may include generating 112 a hypothetical transition scenario. As used herein, the term "hypothetical transition scenario" is intended to include a state transition that would comply with all of the rules and constraints of the state transition model, but which transition has not yet (and need not necessarily) occurred. Accordingly, a hypothetical transition scenario may allow a user to explore one or more possible "what if" scenarios within the constraints of the state transition model of the active application. Such hypothetical scenarios may, for example, allow a user to visualize what transitions and states may be possible for the record, what information may be required to undertake various transitions, and the like. For example, user 46 may whish to determine what information may be required to transition record xyz to the "complete" state. Accordingly, user 46 may select (e.g., by right-clicking) "complete" state block 170 from within graphical user interface 156 using onscreen pointer 154. In response to right-clicking "complete" state block 170, state transition process 10 may provide 114 an indication of the requirements for the hypothetical transition scenario. For example, and as shown in FIG. 6, state transition process 10 may render popup 172, which may include a listing of the requirements for transitioning record xyz to the "complete" state. Providing 114 an indication of the requirements for the hypothetical scenario may include providing 114 an indication of the requirements for transitioning to the selected state from the immediately preceding state. Additionally/alternatively, providing 114 an indication of the requirements for the hypothetical scenario may include providing 114 an indication of the requirements for transitioning between each of the state between the current state of record xyz (e.g., the "triaged" state in FIG. 6) and the selected state. Further, in addition/as an alternative to selecting a hypothetical scenario including a terminal state, user 46 may provide an indication of a path through the state transition model, or other details (e.g., via various gestures, such as control-clicking various actions, or the like) associated with a desired hypothetical scenario. State transition process 10 may generate 112 a hypothetical scenario and provide 114 an indication of the requirements for the hypothetical scenario.

In addition to being easily invoked (e.g., by selecting "state transition model view" button 152), graphical user interface 156 may similarly be easily dismissed, e.g., by closing the graphical user interface in a generally conventional manner. Further, if no action is taken by the user within a definable time period, state transition process 10 and/or server application 20 may automatically dismiss the graphical user interface. Dismissing the graphical user interface may return the user to display 150 associated with the active application (e.g., server application 20).

While the examples presented herein-above relate to a relatively simple state transition model including a single state transition model, such examples have been presented for the purpose of illustration only. The principles herein may be equally applied to more complex applications or processes involving complex and/or multiple state transition models.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   dynamically generating, by a computing device, a state transition model for an active application, based upon, at least in part, one or more of a state transition specification, state chart rules and capabilities included within the active application;
   generating, by the computing device, a graphical user interface based upon, at least in part, the state transition model for the active application, the graphical user interface including an indication of a current state of a record within the active application, wherein the graphical user interface includes a visual indication of non-permissible transitions of the record based upon, at least in part, one or more of a record attribute, a permission of a current user of the active application, and an authorization of the current user; and
   manipulating, by the computing device, the record within the active application in response to an input received in association with the graphical user interface, wherein manipulating the record includes generating a hypothetical transition scenario of the active application, wherein the hypothetical scenario includes a state transition that complies with all the state chart rules and constraints of the state transition model where a transition of the hypothetical transition scenario has not yet occurred, and one of the constraints of the state transition is related to the current user.

2. The method of claim 1, wherein the graphical user interface includes an indication of permissible transitions of the record.

3. The method of claim 1, wherein manipulating the record within the active application includes transitioning the record from the current state to a new state.

4. The method of claim 3, wherein transitioning the record from the initial state to the new state includes receiving, in association with the graphical user interface, a required input to transition the record from the initial state to the new state.

5. The method of claim 1, wherein generating the hypothetical transition scenario includes providing an indication of requirements for the hypothetical transition scenario.

6. The method of claim 1, wherein the graphical user interface includes annotative information regarding the current state of the record.

7. The method of claim 1, wherein the graphical user interface includes a visual representation of at least a portion of a state transition model for the record.

8. A computer program product residing on a non-transitory computer readable medium having a plurality of instructions stored thereon, which, when executed by a processor, cause the processor to perform operations comprising:
   dynamically generating a state transition model for an active application, based upon, at least in part, one or more of a state transition specification, state chart rules and capabilities included within the active application;
   generating a graphical user interface based upon, at least in part, the state transition model for the active application, the graphical user interface including an indication of a current state of a record within the active application, wherein the graphical user interface includes a visual indication of non-permissible transitions of the record based upon, at least in part, one or more of a record attribute, a permission of a current user of the active application, and an authorization of the current user; and
   manipulating the record within the active application in response to an input received in association with the graphical user interface, wherein manipulating the record includes generating a hypothetical transition scenario of the active application, wherein the hypothetical scenario includes a state transition that complies with all the state chart rules and constraints of the state transition model where a transition of the hypothetical transition scenario has not yet occurred, and one of the constraints of the state transition is related to the current user.

9. The computer program product of claim 8, wherein the graphical user interface includes an indication of permissible transitions of the record.

10. The computer program product of claim 8, wherein the instructions for manipulating the record within the active application include instructions for transitioning the record from the current state to a new state.

11. The computer program product of claim 10, wherein the instructions for transitioning the record from the initial state to the new state include instructions for receiving, in association with the graphical user interface, a required input to transition the record from the initial state to the new state.

12. The computer program product of claim 8, wherein the instructions for generating the hypothetical transition scenario include instructions for providing an indication of requirements for the hypothetical transition scenario.

13. The computer program product of claim 8, wherein the graphical user interface includes annotative information regarding the current state of the record.

14. The computer program product of claim 8, wherein the graphical user interface includes a visual representation of at least a portion of a state transition model for the record.

15. A system comprising:
- a processor;
- a memory architecture coupled with the processor;
- a first software module executable by the processor and the memory architecture, the first software module configured to dynamically generate a state transition model for an active application, based upon, at least in part, one or more of a state transition specification, state chart rules and capabilities included within the active application;
- a second software module executable by the processor and the memory architecture, the second software module configured to generate a graphical user interface based upon, at least in part, the state transition model for the active application, the graphical user interface including an indication of a current state of a record within the active application, wherein the graphical user interface includes a visual indication of non-permissible transitions of the record based upon, at least in part, one or more of a record attribute, a permission of a current user of the active application, and an authorization of the current user; and
- a third software module executable by the processor and the memory architecture, the third software module configured to manipulate the record within the active application in response to an input received in association with the graphical user interface, wherein manipulating the record includes generating a hypothetical transition scenario of the active application, wherein the hypothetical scenario includes a state transition that complies with all the state chart rules and constraints of the state transition model where a transition of the hypothetical transition scenario has not yet occurred, and one of the constraints of the state transition is related to the current user.

16. The system of claim 15, wherein the graphical user interface includes an indication of permissible transitions of the record.

17. The system of claim 15, wherein the third software module, configured to manipulate the record within the active application, is configured to transition the record from the current state to a new state.

18. The system of claim 17, wherein the third software module, configured to transition the record from the initial state to the new state, is configured to receive, in association with the graphical user interface, a required input to transition the record from the initial state to the new state.

19. The system of claim 15, wherein the third software module, configured to generate the hypothetical transition scenario, is configured to provide an indication of requirements for the hypothetical transition scenario.

20. The system of claim 15, wherein the graphical user interface includes annotative information regarding the current state of the record.

21. The system of claim 15, wherein the graphical user interface includes a visual representation of at least a portion of a state transition model for the record.

* * * * *